J. L. BOYLE.
SAUSAGE MACHINE.
APPLICATION FILED OCT. 28, 1909.

994,714.

Patented June 13, 1911.

WITNESSES
F. J. Hartman.
Addison Irwin Gardner

INVENTOR
James L. Boyle.
BY
ATTORNEY

J. L. BOYLE.
SAUSAGE MACHINE.
APPLICATION FILED OCT. 28, 1909.
994,714.
Patented June 13, 1911.
5 SHEETS—SHEET 3.
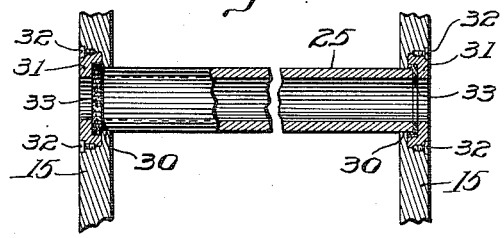
Fig. 6.
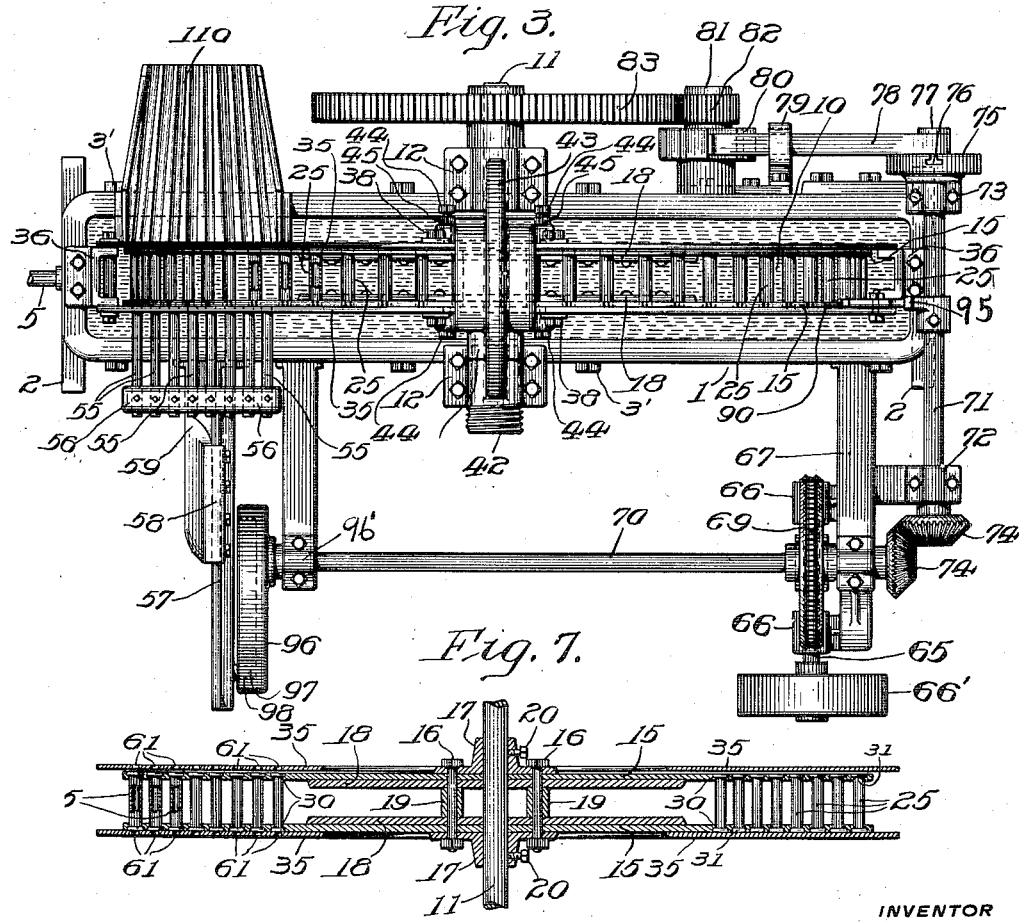
Fig. 3.
Fig. 7.
INVENTOR
James L. Boyle.
WITNESSES
BY
ATTORNEY

J. L. BOYLE.
SAUSAGE MACHINE.
APPLICATION FILED OCT. 28, 1909.

994,714.

Patented June 13, 1911.
6 SHEETS—SHEET 4.

WITNESSES
F. J. Hartman
Addison Irwin Gardner

INVENTOR
James L. Boyle.
BY
ATTORNEY

J. L. BOYLE.
SAUSAGE MACHINE.
APPLICATION FILED OCT. 28, 1909.

994,714.

Patented June 13, 1911.

5 SHEETS—SHEET 5.

WITNESSES
F. J. Hartman.
Addison ...Gardner

INVENTOR
James L. Boyle.
BY
ATTORNEY

UNITED STATES PATENT OFFICE.

JAMES LEE BOYLE, OF OCEAN CITY, NEW JERSEY, ASSIGNOR OF ONE-HALF TO JAMES S. KNEISLER, OF PHILADELPHIA, PENNSYLVANIA.

SAUSAGE-MACHINE.

994,714. Specification of Letters Patent. Patented June 13, 1911.

Application filed October 28, 1909. Serial No. 525,104.

*To all whom it may concern:*

Be it known that I, JAMES LEE BOYLE, a citizen of the United States, and a resident of Ocean City, county of Cape May, State of New Jersey, have invented certain new and useful Improvements in Sausage-Machines, of which the following is a full, clear, and exact disclosure, reference being had to the accompanying drawings, forming part of this specification.

The main objects of this invention are to provide an improved sausage machine; to provide a sausage machine whereby a plurality of sausages may be made simultaneously, and which will operate automatically to deliver a plurality of sausages of uniform dimensions and of symmetrical contour, each sausage being provided by the machine with an external film or coating of the same material as the body of the sausage, but of greater tensile strength, whereby the sausage will be preserved from deterioration and whereby the sausage will be maintained in a predetermined shape; to provide a sausage machine which will operate to produce sanitary sausages, and which will dispense with the unsanitary and unpalatable cases which have heretofore been used in making sausages; to provide a machine which will produce a sausage of improved flavor and appearance; to provide a machine whereby the cost of producing sausages may be lessened; and to provide other improvements as will appear hereinafter.

Figure 2:
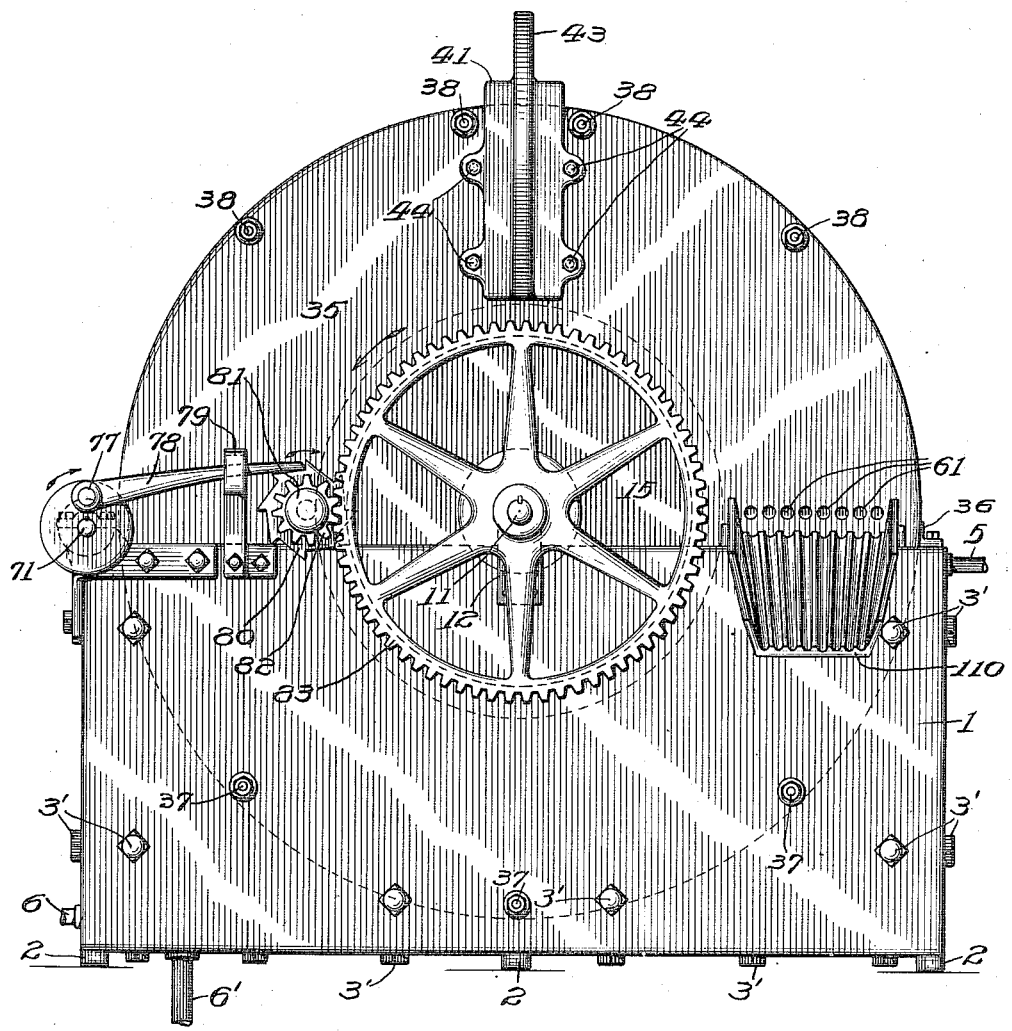
Figure 4:
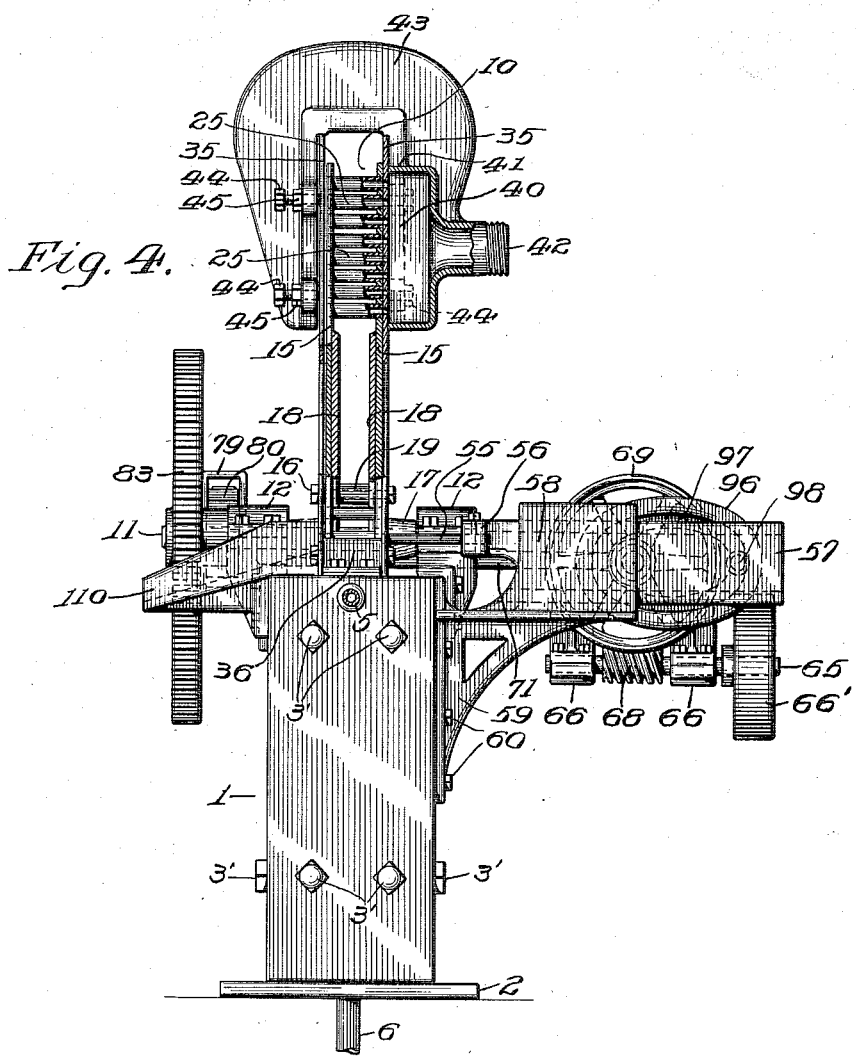
Figure 6:
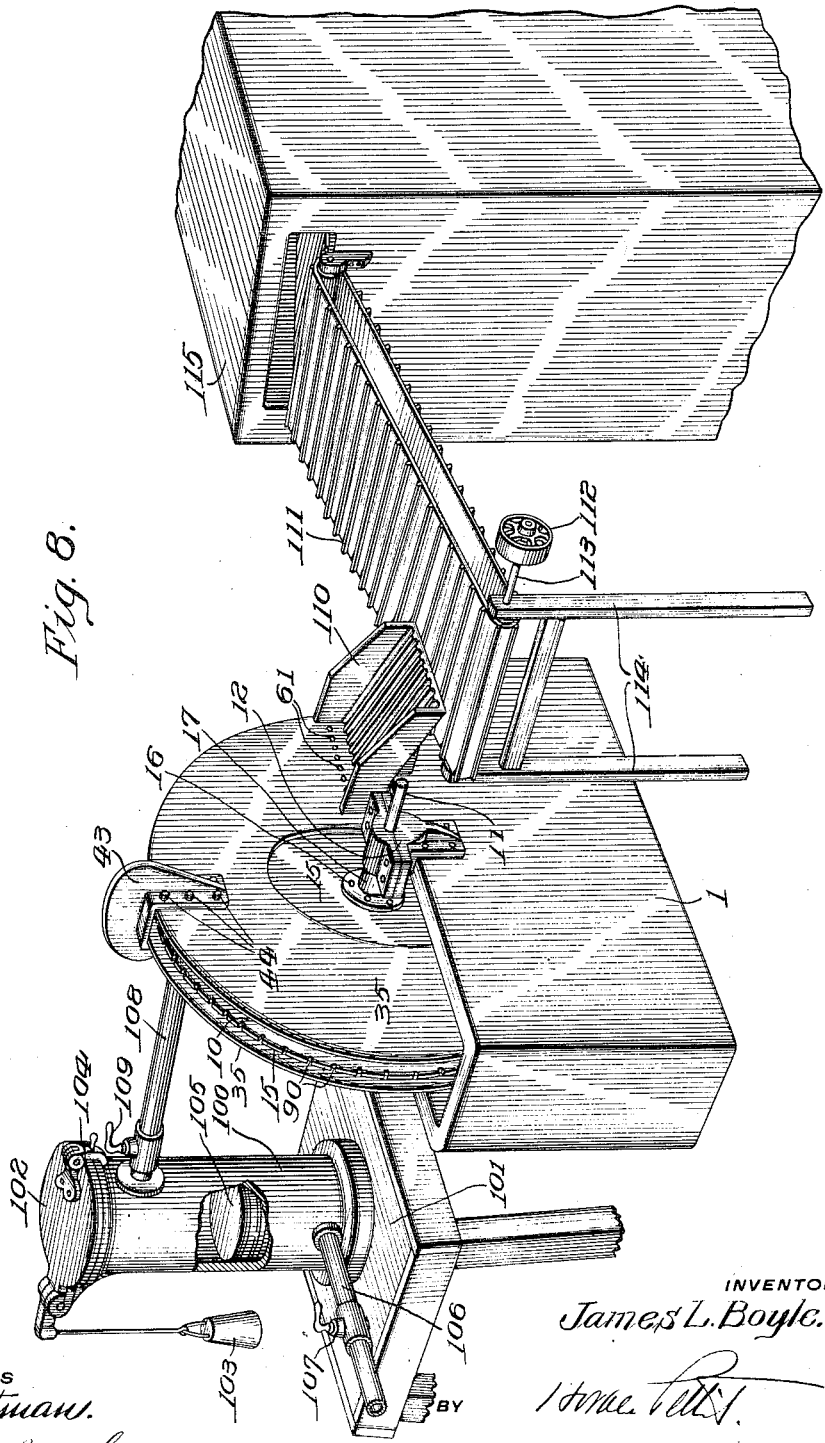

In the accompanying drawings, Figure 1 is a fragmentary rear elevation, partly in vertical longitudinal section of a sausage machine constructed in accordance with this invention; Figs. 2, 3 and 4 are, respectively, a front elevation, a top plan view and fragmentary end elevation partly in vertical transverse section of the same; Figs. 5, 6 and 7 are a fragmentary side elevation and fragmentary horizontal sections, respectively, of portions of the same; and Fig. 8 is a perspective view of the same connected in operative position and provided with means for delivering sausage meat to the machine and a conveyer for receiving sausages from the machine and delivering the same into a smoke-house.

Referring to the drawings, one embodiment of this invention comprises a substantially rectangular tank 1, preferably oblong in both horizontal and vertical transverse sections and forming the base of the machine, the bottom of the tank being provided with downwardly projecting standards 2, upon which the tank is supported. This tank is provided with double spaced walls, 3, held in spaced relationship by bolts 3' and forming a heating jacket 4, which is wholly inclosed and provided upon one side adjacent its upper edge with an inlet pipe 5, and upon its opposite end adjacent the bottom of the tank with an outlet pipe 6, whereby steam or any other suitable heating fluid may be passed through the jacket, and with an outlet pipe 6' from the interior of the tank.

Within the hollow base 1 of the machine is rotatably supported a wheel or cylinder 10 upon an axle 11, mounted in bearing boxes 12, which are rigidly secured upon opposite sides respectively of the tank or base 1, and which project slightly above the upper edge thereof. The wheel 10 comprises two spaced metal disks 15, arranged upon the axle 11 of the wheel, coaxially therewith, and the outer surfaces of these disks are spaced apart a distance equal to the length of the sausage which it is desired to manufacture, and are clamped in this fixed relationship upon the axle 11 by means of bolts 16 which extend through flanged collars or hubs 17 surrounding the axle 11 upon opposite sides of the disks 15 and through circular plates 18, which are of less diameter than the disks 15 and which are arranged between the disks, one being held against each disk by means of sleeves 19 surrounding the bolt 16 between the plates. Set screws 20 or other suitable means may be used between the flanged hubs 17 and the axle 11, to hold the wheel 10 fixed with respect to the axle.

For forming the sausages, the wheel 10 is provided with a plurality of tubes or molds, 25, which are arranged radially with respect to the wheel, in a plurality of series or rows equi-spaced circumferentially around the wheel, each series extending from a point adjacent the circumference of the wheel to a point about midway between the periphery and axis of the wheel. These tubes 25 are of equal dimensions and have an external diameter equal to the diameter of the sausage which it is desired to manufacture. The length and diameter of the tube and the corresponding size of the wheel may obviously be varied to suit various sizes of sausage. The tubes 25 are preferably made of glass, or porcelain, or other vitreous material, or of porcelain-lined metal, or other suitable material, but may be made of any suitable material to which the sausage meat will not adhere sufficiently to prevent the ejection of the sausages from the molds in an unbroken condition. To prevent the breaking of the tubes when the tubes are made of glass or other fragile material, the ends of each tube terminate in apertures 30 provided therefor in the disks 15 of the wheel and within the outer surfaces of the disk respectively. A flanged metal bushing 31, having an internal diameter equal to the internal diameter of the tube 25 is seated concentric with the tube and opposite each end thereof, in a recess provided therefor in the outer surface of each plate 15, the bushing being held in place by means of screws 32, or in any other suitable manner. Between each bushing 31 and the adjacent end of each tube 25, is clamped a yielding flanged packing ring 33, which acts to hold the tubes against movement with respect to the wheel without causing any stress upon the tubes which would tend to break them.

The wheel 10 is mounted to rotate between two vertically arranged circular covers 35 which are of slightly larger diameters than the outside diameter of the wheel, and which are held in fixed positions coaxially with the wheel by means of brackets 36 which are rigidly secured to the upper edges of the opposite ends of the tank 1, respectively, and also by means of bolts 37 which pass through the sides of the tank 1 and through the covers 35 adjacent their periphery and outside of the wheel 10, the bolts 37 being provided with suitable sleeves for holding the covers against lateral movement. The upper edges of the covers 35 are also held in spaced relationship by means of bolts 38 extending through the covers adjacent their peripheries, each bolt being provided with suitable sleeves 39 surrounding the bolts between the covers. The inner surface of each cover 35 abuts against the adjacent outer surface of the wheel 10 and the covers thus form closures for the open ends of the tubes 25. For automatically injecting sausage meat into the tubes, the cover 35 over the rear ends of the tubes is provided with an oblong opening 40, adapted to expose the ends of a single series of the tubes as the wheel 10 is revolved, and over this opening is secured a supply hood 41, having an inlet pipe 42 communicating with a source of supply of sausage meat. The hood 41 is preferably provided with a yoke or clamp 43, which embraces the peripheral edges of both covers 35 to hold the hood rigidly in position, bolts or set screws 44, or other suitable means being used to clamp the hood and its yoke rigidly to the covers. The position of the rear cover 35 inclosed by the yoke 43 is preferably spaced slightly away from the rear surface of the wheel 10 to permit the escape of air from each row of molds as it is being filled with sausage meat, and this space may be adjusted by tightening or loosening the bolts 44 in the rear of the yoke, these bolts being preferably provided with lock nuts 45 to hold them in any position of adjustment.

For automatically ejecting sausages from the tubes a plurality of plungers, 55, arranged parallel to the axis of the wheel 10 and radially with respect thereto, are fixed upon a head 56 which is rigid with a slider 57 mounted to reciprocate between fixed ways 58, carried by a bracket 59 rigidly secured to the rear side of the tank 1 by means of bolts 60. These plungers 55 are preferably located in a horizontal plane slightly above the upper edge of the tank 1 of the machine and upon one side of the wheel 10, the plungers being arranged to register with and to engage in a series of tubes of the wheel to eject sausages therefrom, a series of apertures 61 being provided in each cover 35 of the wheel and in alinement with the plungers to permit of this action.

For actuating the movable parts of the machine, a main driving shaft 65 is rotatably mounted parallel to the axis of the wheel 10 in bearings 66 carried by a bracket 67 rigidly secured to the tank 1 and projecting rearwardly therefrom. This main driving shaft 65 is provided at its outer end with a driving pulley 66' fixed thereon, or with other suitable means for the transmission of power to the machine, and midway of its ends is provided with a worm 68 which meshes with a worm gear 69 fixed upon a cam shaft 70 upon the inside and adjacent the bracket 67, upon which one end of the cam shaft is rotatably mounted.

For giving an intermittent rotary motion to the wheel 10, a pawl shaft 71 is rotatably mounted at one end in a bearing 72 carried by the bracket 67 and at its other end in a bracket 73 rigidly secured to the tank 1. This pawl shaft 71 is driven from the cam shaft 70 by means of beveled gears 74 of equal diameter so that a single rotation of the cam shaft will give a single rotation to the pawl shaft. At its forward end this pawl shaft 71 has fixed thereon a face plate 75 provided with an undercut radial slot 76, in which is adjustably secured a crank pin 77, upon which is rotatively mounted one end of a pawl 78, the other end of which is slidably and freely mounted in a guide 79 and engages the upper side of a ratchet wheel 80, fixed upon a shaft 81 rotatably mounted upon the front of the tank 1 and having fixed on its other end a pinion 82 which engages a gear 83 fixed upon the axle 11 of the wheel 10. The ratio between the number of teeth on the pinion 82 and the number of teeth in the gear 83 is such that when the pawl is reciprocated once rotating the ratchet through a predetermined arc, the wheel will be rotated through an arc corresponding to the arc between two adjacent rows of sausage molds.

The tubes 25 are so arranged in the wheel 10 that when one row or series of tubes is in alinement with the outlet opening 40 of the supply hood 41 on the rear cover of the tubes, a second row of tubes will be in alinement with the plungers 55, whereby the sausages are ejected from the tubes, and to hold the tubes temporarily in this positon, the wheel 10 is provided with a recess 90 for each row of tubes, and a spring catch 91 pivoted intermediate its ends as at 92, to one of the fixed covers 35, and having one end, 93, bent inwardly and adapted to engage in one of the recesses 90, and normally pressed toward the wheel by means of a spring 94 connected at one end to the cover 35 and engaging at its other end the outer end of the catch 91. A lug or cam 95 is fixed upon the shaft 71 which actuates the pawl-bar 78 and is arranged opposite the outer end of the catch 91, so that at each revolution of the shaft 71 the lug 95 will strike the outer end of the catch 91 and release the catch from the wheel, permitting the catch to return into position against the wheel after the lug has passed the catch, whereby in the operation of the machine the wheel will be held temporarily stationary by the catch at each notch, and the wheel will thus be given an intermittent rotary movement to bring the rows of molds consecutively into alinement with the outlet 40 of the supply hood 41.

For reciprocating the plungers 55, the inner end of the cam shaft 70, which is rotatably supported in a bracket 96' secured to the rear wall of the tank 1 is provided with an eccentric disk or cam 96 fixed thereon and having an eccentric groove 97 in its outer surface, in which slidably engages a follower 98 fixed upon the slider 57 carrying the head 56, to which the plungers are fixed. The cam 96 and its groove 97 and the plungers 55 are so proportioned that when the plungers are in their rearmost or outermost positions the inner ends of the plungers will rest within the rear cover 35 and preferably flush with the inner surface thereof, and when in their innermost positions will extend through a series of tubes and project through the front cover 35 of the tubes to eject the sausages from the machine. The cam groove is so formed that the plungers 55 will be reciprocated only during each interval that a series of molds is held stationary by the spring catch 91, and in alinement with the plungers.

For supplying the hood 41 of the sausage machine with sausage meat under compression, a cylindrical tank 100, is located in the rear of the hood upon a suitable support 101. The upper end of this tank is closed by a cover 102, hinged thereto and preferably provided with a counterweight 103, and with a suitable latch 104, for holding the cover tightly in a closed position. A plunger or piston 105 fits snugly but reciprocatively within the cylinder 100, and the portion of the cylinder below the piston communicates through a pipe 106, controlled by a valve 107 with a source of water pressure or any other suitable source of pressure, whereby the piston 105 is pressed upwardly in its cylinder. The portion of the cylinder above the piston 105 communicates with the supply hood 40, through a pipe 108, controlled by a valve 109.

For receiving the sausages after they have been ejected from their tubes 25 of the machine, an inclined chute 110 is mounted upon the upper edge of the front of the tank 1. This chute has a longitudinal groove in its upper surface opposite each plunger and extends downwardly and terminates over an endless conveyer 111, which is driven by any suitable motor acting upon the driving pulley 112, mounted upon the drive shaft 113, which carries the conveyer, the shaft being mounted to rotate in suitable supports 114. The conveyer 111 deposits the sausages in a smoke-house 115, where the sausages may be thoroughly smoked, after which the sausages are ready to be marketed.

In the operation of this machine, the interior of the supply tank 100 above the piston 105 is filled with any suitable mixture of sausage meat, such as is ordinarily used in filling casings, for instance, a combination of beef and pork properly seasoned may be used, to which cereals may be added as a binder to absorb moisture. The tank 1, in which the wheel 10 is mounted to revolve, is filled with water to which salt or other soluble material may be added if it is desired to increase the temperature of the water above 212 degrees. Steam or other heating fluid is then permitted to flow through the heating jacket 4, surrounding the water in the tank, and the water is raised in this manner preferably to a temperature of about 155 to 160 degrees F., where it is maintained substantially stationary by regulating the flow of heating fluid through the jacket. After the water has been heated to a proper temperature, the machine is set into operation by applying power to the driving pulley 66' of the sausage machine, and the driving pulley 112 of the conveyer, and the sausage compressor for supplying sausage meat to the hood 40 of the machine is put into operation by opening the valves 107 and 109. The wheel carrying the tubes 25 is thus given an intermittent rotary motion, the wheel stopping each time that a row of tubes is brought opposite the injection hood 40 long enough to permit the rows of tubes to be filled consecutively. The wheel revolves in a direction from the hood or inlet away from the plungers 55, as indicated by the arrow, the ends of the tubes being kept closed by the fixed covers 35 as the tubes thus filled pass around below the surface of the water. The machine is preferably operated at a rate of speed that will keep the filled tubes about five minutes under water, and during this period the heat of the water is transmitted through the tubes and through the covers to the outer surfaces of the sausages in the tubes, and forms a film surrounding each sausage by a process somewhat in the nature of searing. When each row of filled tubes emerges from the water, and into alinement with the plungers 55, and outlets through the front covers 35, of the wheel, the plungers which in their rearmost position rest with their foremost ends in the openings provided therefor in the rear cover of the wheel, are thrust forward by the action of the cam disk 96 and cam follower 98, and the sausages in the tubes opposite the plungers are ejected from the tubes and fall upon the inclined chute 110, from whence they slide down upon the endless conveyer 111 and are carried into the smoke-house 115.

The sausages made by this machine are uniform in size, and have a beautiful brown color, and a fine flavor similar to that of beef broiled over coals, and there is an absence of the well-known disagreeable flavor which is imparted by the casings to sausages as they have heretofore been made. The film produced around each sausage by this machine is smooth and tough and retains the sausage in a predetermined shape, so that the sausage can be handled and served in any manner heretofore customary with sausages which have been inclosed in separate casings. This machine also reduces the cost of manufacturing sausages, as it dispenses with the expense of casings which have been heretofore required, and in dispensing with the casings, this machine also avoids the danger of disease germs which are often found in casings, as such casings are frequently imported from countries where there is no government inspection of meats. The sausage produced by this machine is therefore cheap, wholesome, and palatable.

Although only a single form has been shown in which this invention may be embodied, it is obvious that many changes might be made in the construction described without departing from the spirit of this invention or the scope of the appended claims.

Having thus fully described my invention, I claim and desire to protect by Letters Patent of the United States:

1. A sausage machine comprising a mold, a tank into which said mold is designed to pass, means for introducing sausage meat into said mold, and means mounted to reciprocate in a straight horizontal fixed path for ejecting said meat from said mold.

2. A sausage machine comprising a tank adapted to contain a fluid, a mold adapted to hold sausage meat and mounted to be moved upwardly and downwardly in said tank, means of forcing sausage meat into said mold, and means of ejecting said meat from said mold.

3. A sausage machine comprising a tank adapted to contain a fluid, a mold adapted to hold sausage meat and mounted to be moved upwardly and downwardly in said tank, and means for heating the fluid in said tank.

4. In a sausage machine, the combination with a mold mounted to move in a fixed path, in a vertical plane, of means for filling said mold with sausage meat at one point in its path, and means for ejecting the sausage meat from said mold at another point in its path, said mold being held stationary while being filled.

5. A sausage machine comprising a mold mounted to move in a circular path about a substantially horizontal axis, means to inject sausage meat into said mold at one point of its path and means to eject meat from said mold at another point of its path, said mold being held stationary while being filled.

6. A sausage machine, comprising a mold mounted to move in a predetermined path, in a vertical plane, means to inject sausage meat into said mold at one point of its path, means to eject sausage meat from said mold at another point in its path, and means to apply heat to said sausage meat in said mold between said points.

7. A molding machine comprising a tank adapted to hold a liquid, a mold mounted to rotate about a horizontal axis and to engage in said tank, and a closure for said mold.

8. A sausage machine comprising a plurality of molds adapted to receive sausage meat, and horizontally reciprocating means arranged to eject said meat simultaneously from said molds.

9. A sausage machine comprising a plurality of molds mounted to move in unison, and means to inject sausage meat horizontally and simultaneously into all of said molds.

10. A sausage machine comprising a plurality of molds mounted to move in unison, means to inject sausage meat horizontally into one of said molds, and means to eject meat horizontally and simultaneously from another of said molds, said molds being held stationary during the injection and ejection of the meat.

11. A molding machine comprising a tank, a plurality of molds mounted to be moved upwardly and downwardly in said tank, means to positively inject material into said molds, and means to positively eject material from said molds.

12. A sausage machine comprising a mold rotatable about a horizontal axis, driving means, means actuated by said driving means to give an intermittent movement to said mold, means to inject sausage into said mold at a predetermined point in said path, and means actuated by the said driving means to eject said sausage meat from said mold at another point.

13. A sausage machine comprising a mold, means for giving an intermittent movement to said mold in a predetermined path in a vertical plane, means for injecting sausage meat into said mold when at rest at one point of said path, and means for ejecting said meat from said mold when it rests at another point of said path.

14. A sausage machine comprising a mold, means for giving an intermittent movement to said mold about a horizontal axis, means for injecting sausage meat into said mold when at rest at one point of said path, means for ejecting said meat from said mold when it rests at another point of said path, and means for applying heat to said mold between said points.

15. A sausage machine comprising a wheel mounted to rotate about a horizontal axis, a plurality of molds carried by said wheel, said molds being arranged longitudinally parallel with the axis of said wheel and in radial series with respect thereto, actuating mechanism for imparting a rotary movement to said wheel, means for injecting sausage meat simultaneously into said series of molds, and means actuated by said mechanism for ejecting sausage meat simultaneously from said molds.

16. A sausage machine comprising a wheel mounted to rotate about a horizontal axis, a plurality of molds carried by said wheel, said molds being arranged longitudinally parallel with the axis of said wheel and in a plurality of radial series with respect thereto, actuating mechanism for imparting a rotary movement to said wheel, means for injecting sausage meat simultaneously into one series of said molds, and means actuated by said mechanism for simultaneously ejecting sausage meat from another series of said molds simultaneously with the injection of meat into said first mentioned series.

17. A sausage machine comprising a wheel mounted to rotate about a horizontal axis, a plurality of molds carried by said wheel, said molds being arranged longitudinally parallel with the axis of said wheel and in a plurality of radial series with respect thereto, actuating mechanism for imparting a rotary movement to said wheel, means for injecting sausage meat simultaneously into a series of said molds, means actuated by said mechanism for ejecting sausage meat simultaneously from another series of said molds simultaneously with the injection of meat into a series of said molds, and means for heating said sausage meat in said molds as said wheel is rotated.

18. A sausage machine comprising a tank adapted to contain a fluid, a rotary wheel extending in said tank, means for heating said fluid, and a mold carried by said wheel and adapted to contain sausage meat.

19. A sausage machine comprising a tank adapted to contain a fluid, a rotary wheel extending in said tank, means for heating said fluid, a mold carried by said wheel and adapted to contain sausage meat, and a fixed closure for the ends of said mold located upon one side of said wheel.

20. A sausage machine comprising a tank adapted to contain a fluid, a rotary wheel extending in said tank, means for heating said fluid, a mold carried by said wheel and adapted to contain sausage meat, and a fixed closure for one end of said mold, located upon one side of said wheel, said closure being provided with an opening through which sausage meat may be injected into said mold.

21. A sausage machine comprising a tank adapted to contain a fluid, a rotary wheel extending in said tank, means for heating said fluid, a mold carried by said wheel and adapted to contain sausage meat, a fixed closure for one end of said mold located upon one side of said wheel, said closure being provided with an opening through which sausage meat may be injected into said mold, and an opening through which sausage meat may be ejected from said mold.

22. A sausage machine comprising a tank adapted to contain a heating fluid, a wheel rotatively mounted and depending in said tank, a plurality of molds carried by said wheel and arranged parallel to the axis thereof, a fixed closure upon each side of said wheel for covering the open ends of said molds, one of said closures being provided with an opening, a hood covering said opening, means for forcing sausage meat into said molds through said hood, and a plurality of plungers mounted to reciprocate through one of said closures to eject sausage meat from said molds through the other closure.

23. A molding machine comprising a tank adapted to contain a heating fluid, a wheel rotatable about a horizontal axis and depending in said tank, a plurality of molds carried by said wheel, actuating means to give said wheel an automatic intermittent rotary movement, and means connected to said actuating means for simultaneously ejecting material into one of said molds and ejecting material from another of said molds when said wheel is at rest.

24. A sausage machine comprising a mold arranged to move in a vertical plane, means for introducing sausage meat into said mold, a receptacle into which said mold passes during a part of its course of movement, and means mounted to reciprocate in a straight horizontal fixed path for ejecting said meat from said mold.

25. A sausage machine comprising a series of molds arranged to revolve in a vertical plane, means for introducing sausage meat into said molds, a receptacle into which said molds pass during a part of their course of movement, and means mounted to reciprocate in a straight horizontal fixed path for ejecting said meat from said molds.

26. A sausage machine comprising a mold rotatable about a horizontal axis, a tank into which said mold is designed to pass, means for introducing sausage meat into said mold, actuating means for giving said mold an automatic intermittent movement, and means operatively connected with said actuating means for automatically ejecting sausage meat from said mold while said mold is at rest.

27. A sausage machine comprising a plurality of molds rotatable about a horizontal axis adapted to hold sausage meat, a tank into which said mold is designed to pass, actuating means for imparting an intermittent movement to said molds, means to inject sausage meat into one of said molds while at rest, and means operatively connected to said actuating means for ejecting sausage meat from another of said molds while at rest.

28. A sausage machine comprising a plurality of molds rotatable about a horizontal axis adapted to hold sausage meat, a tank into which said mold is designed to pass, automatic actuating means for imparting an intermittent movement to said molds, means to inject sausage meat into one of said molds while at rest, and means operatively connected to said actuating means for ejecting sausage meat from another of said molds while at rest.

29. A sausage machine comprising a plurality of molds rotatable about a horizontal axis adapted to hold sausage meat, a tank into which said mold is designed to pass, actuating means for imparting an automatic intermittent movement to said molds, means to inject sausage meat into one of said molds while said mold is at rest, and means acting simultaneously with said injecting means and operatively connected to said actuating means for automatically ejecting sausage meat from another of said molds.

30. A sausage machine comprising a series of molds arranged to revolve in a vertical plane, means for introducing sausage meat into said molds, a tank into which said molds pass during a part of each cycle of rotation, and means mounted to reciprocate in a straight horizontal fixed path for ejecting said meat from said molds.

31. A sausage machine comprising the combination with a vertically rotatable cylindrical mold adapted to hold sausage meat, a tank into which said mold is designed to pass, of actuating means for giving said mold a lateral intermittent movement, and a plunger having a cylindrical end fitting snugly in said mold and mounted to reciprocate in a fixed horizontal straight path and operatively connected to said operating means for automatically ejecting sausage meat from said mold.

32. A molding machine comprising a tank adapted to contain a fluid, a rotatable wheel depending in said tank, a plurality of molds carried by said wheel, means for automatically injecting material into said molds, and means for automatically ejecting material from said molds.

33. A molding machine comprising a tank adapted to contain a fluid, a mold movable in said tank, automatic means for injecting material into said mold, and automatic means for ejecting material from said mold.

34. A molding machine comprising a tank adapted to contain a fluid, a non-porous mold having oppositely open ends movable in said tank, a fixed means to form a closure for each of said open ends during the movement of said mold in said tank.

35. A molding machine comprising a tank adapted to contain a fluid, a mold having oppositely open ends movable in said tank, and fixed means arranged to form a closure for each of said open ends during the movement of said mold in said tank.

36. A molding machine comprising a tank adapted to contain a heating fluid, a rotatable wheel depending in said tank, and a plurality of molds carried by said wheel and arranged in radial series.

37. A molding machine comprising a tank adapted to contain a heating fluid, a rotatable wheel depending in said tank, a plurality of molds carried by said wheel, actuating means to give said wheel an automatic intermittent rotary movement, means connected to said actuating means for injecting material into said molds, and means connected to said actuating means for ejecting material from said molds.

38. A molding machine comprising a tank, a series of non-porous molds adapted to enter said tank at intervals, means to inject sausage meat into said molds, means to eject said sausage meat from said molds, and means to apply heat to said sausage meat while in said molds under pressure.

In witness whereof, I have hereunto set my hand this twenty sixth day of October, 1909.

JAMES LEE BOYLE.

Witnesses:
ADDISON IRWIN GARDNER,
ALEXANDER PARK.